(12) United States Patent
Durig et al.

(10) Patent No.: US 8,179,842 B2
(45) Date of Patent: *May 15, 2012

(54) ENCAPSULATING UPPER LAYERS OF CDMA SIGNALING BETWEEN A MULTI-MODE DEVICE AND A SIGNALING GATEWAY

(75) Inventors: Dan Durig, Olathe, KS (US); Arun Santharam, Olathe, KS (US); Robert C. Lamb, Blue Springs, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/987,775

(22) Filed: Jan. 10, 2011

(65) Prior Publication Data

US 2011/0103346 A1 May 5, 2011

Related U.S. Application Data

(63) Continuation of application No. 11/564,227, filed on Nov. 28, 2006, now Pat. No. 7,869,827.

(51) Int. Cl.
*H04W 4/00* (2009.01)
(52) U.S. Cl. ........ 370/328; 370/331; 370/311; 370/342; 455/414.1; 455/417; 455/432.2; 455/445; 455/552.1; 455/556.1
(58) Field of Classification Search ............... 455/414.4, 455/417, 432.2, 435.2, 445, 552.1, 556.1; 370/331, 328, 311, 342
See application file for complete search history.

(56) References Cited

U.S. PATENT DOCUMENTS

| 6,178,337 | B1 | 1/2001 | Spartz et al. |
| 6,438,114 | B1* | 8/2002 | Womack et al. ............... 370/329 |
| 6,879,600 | B1 | 4/2005 | Jones et al. |
| 7,010,300 | B1* | 3/2006 | Jones et al. .................... 455/439 |
| 7,079,841 | B2* | 7/2006 | Park .............................. 455/436 |
| 7,653,350 | B2* | 1/2010 | Camp, Jr. ..................... 455/41.2 |
| 2001/0036830 | A1* | 11/2001 | Wu et al. ....................... 455/436 |
| 2003/0012159 | A1* | 1/2003 | Vassilovski et al. .......... 370/335 |

(Continued)

FOREIGN PATENT DOCUMENTS

WO    WO 2005/004523    1/2005

(Continued)

OTHER PUBLICATIONS

International Search Report and Written Opinion, mailed Jul. 4, 2008 in connection with International Application No. PCT/US2007/081664, Applicant Sprint Spectrum L.P., International Filing Date Oct. 17, 2007.

*Primary Examiner* — Nimesh Patel
*Assistant Examiner* — Lameka J Kirk

(57) ABSTRACT

Methods and systems are provided for encapsulating upper layers of CDMA signaling messages between a multi-mode device and a signaling gateway. In an exemplary embodiment, a multi-mode device has a CDMA mode and a Wi-Fi mode. In Wi-Fi mode, the device generates an upper-layer portion of a CDMA signaling message. The device then encapsulates the first upper-layer portion in at least one packet-switched-protocol, such as SIP. The device then transmits the encapsulated upper-layer portion of the CDMA signaling message via a Wi-Fi network and a packet-switched network to a signaling gateway, which then translates the upper-layer portion into an SS7 message, and transmits the SS7 message over an SS7 network.

6 Claims, 3 Drawing Sheets

U.S. PATENT DOCUMENTS

| | | |
|---|---|---|
| 2004/0087307 A1 | 5/2004 | Ibe et al. |
| 2006/0121894 A1 | 6/2006 | Ganesan |
| 2006/0239277 A1 | 10/2006 | Gallagher |
| 2007/0014282 A1 | 1/2007 | Mitchell |
| 2007/0263611 A1 | 11/2007 | Mitchell |

FOREIGN PATENT DOCUMENTS

| | | |
|---|---|---|
| WO | WO 2005/081962 | 9/2005 |
| WO | WO 2006/020168 | 2/2006 |
| WO | WO 2006/077587 | 7/2006 |

* cited by examiner

ENCAPSULATING UPPER LAYERS OF CDMA SIGNALING BETWEEN A MULTI-MODE DEVICE AND A SIGNALING GATEWAY

CROSS-REFERENCE TO RELATED APPLICATIONS

This application is a continuation of U.S. patent application Ser. No. 11/564,227, filed Nov. 28, 2006 and entitled "Encapsulating Upper Layers of CDMA Signaling Between a Multi-mode Device and a Signaling Gateway," which is hereby incorporated herein by reference in its entirety.

BACKGROUND

1. Technical Field

The present invention relates to wireless communications and, more particularly, to methods and systems for serving multi-mode communication devices.

2. Description of Related Art

In a cellular wireless communication system, a mobile station communicates over the air with a Radio Access Network (RAN) according to an air interface protocol such as Code Division Multiple Access (CDMA), perhaps in conformance with one or more specifications such as IS-95 and IS-2000. The RAN in turn provides connectivity with one or more transport networks, such as the public switched telephone network (PSTN) and the Internet. To handle call setup, teardown, handoffs, and other functions, the mobile station and the RAN exchange CDMA signaling messages, such as IS-2000 signaling messages. Typically, the RAN is connected with a Mobile Switching Center (MSC), which in turn is connected with a signaling network such as a Signaling System 7 (SS7) network, over which the MSC signals with other switching points to perform call processing on behalf of the mobile station.

To place a call over the PSTN, for instance, the mobile station would, using IS-2000 as an exemplary CDMA protocol, send an IS-2000 origination message over the air to the RAN. That message or an equivalent in another protocol would then be transmitted to the MSC, providing the MSC with the calling and called numbers, among other data. The MSC would then engage in call-setup signaling, such as Integrated Services Digital Network (ISDN) User Part (ISUP) signaling, over the SS7 network, to set up the call via a switching point that serves the called party. When the called party answers, the MSC may then connect the call. Similarly, when the MSC receives a request to connect a call to the mobile station, it would typically cause the mobile station to be paged over the air, and, when the mobile station answers, connect the call. Both the paging and the call connection would typically involve IS-2000 messaging.

With the widespread growth of voice-over-IP (VoIP) technology, the industry has recently begun to introduce mobile stations—referred to herein as multi-mode devices—that are equipped to (i) operate in a CDMA mode, engaging in CDMA communications over a CDMA air interface with a RAN and (ii) operate in a Wi-Fi mode, engaging in VoIP communications in part over Wi-Fi with an access point. The VoIP communications associated with Wi-Fi mode are typically set up using Session Initiation Protocol (SIP) messaging between the device and a signaling gateway having an interface with a packet-based network and an interface with an SS7 network. The signaling gateway translates between SIP messages and SS7 messages to facilitate call processing over the SS7 network on behalf of the device.

For operation in these two modes, multi-mode devices typically include two substantially redundant, robust messaging modules: (1) a CDMA messaging module, for engaging in CDMA signaling with a RAN (when in CDMA mode) and (2) a SIP messaging module, for engaging in SIP signaling with a SIP/SS7 signaling gateway at least in part over Wi-Fi (when in Wi-Fi mode). Each messaging module must be capable of handling call setup, teardown, etc. Thus, where the CDMA messaging module would send, e.g., an IS-2000 origination message, the SIP messaging module may send a SIP INVITE message, and so on. Each of these messages would be complete according to their respective protocols, and contain all necessary data to carry out, in that example, a call-setup function. Development and maintenance of both of these messaging modules—as well as translation and other support on the network side—requires a significant investment of time, manpower, and other resources.

SUMMARY

Methods and systems are provided for encapsulating upper layers of CDMA signaling between a multi-mode device and a signaling gateway. In one aspect of the invention, an exemplary embodiment may take the form of a method. In accordance with the method, an upper-layer portion of a CDMA signaling message is generated. The upper-layer portion is encapsulated in at least one packet-switched-protocol. The encapsulated upper-layer portion is transmitted via a Wi-Fi network and a packet-switched network to a signaling gateway. The signaling gateway translates the upper-layer portion into an SS7 message and transmits the SS7 message over an SS7 network.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
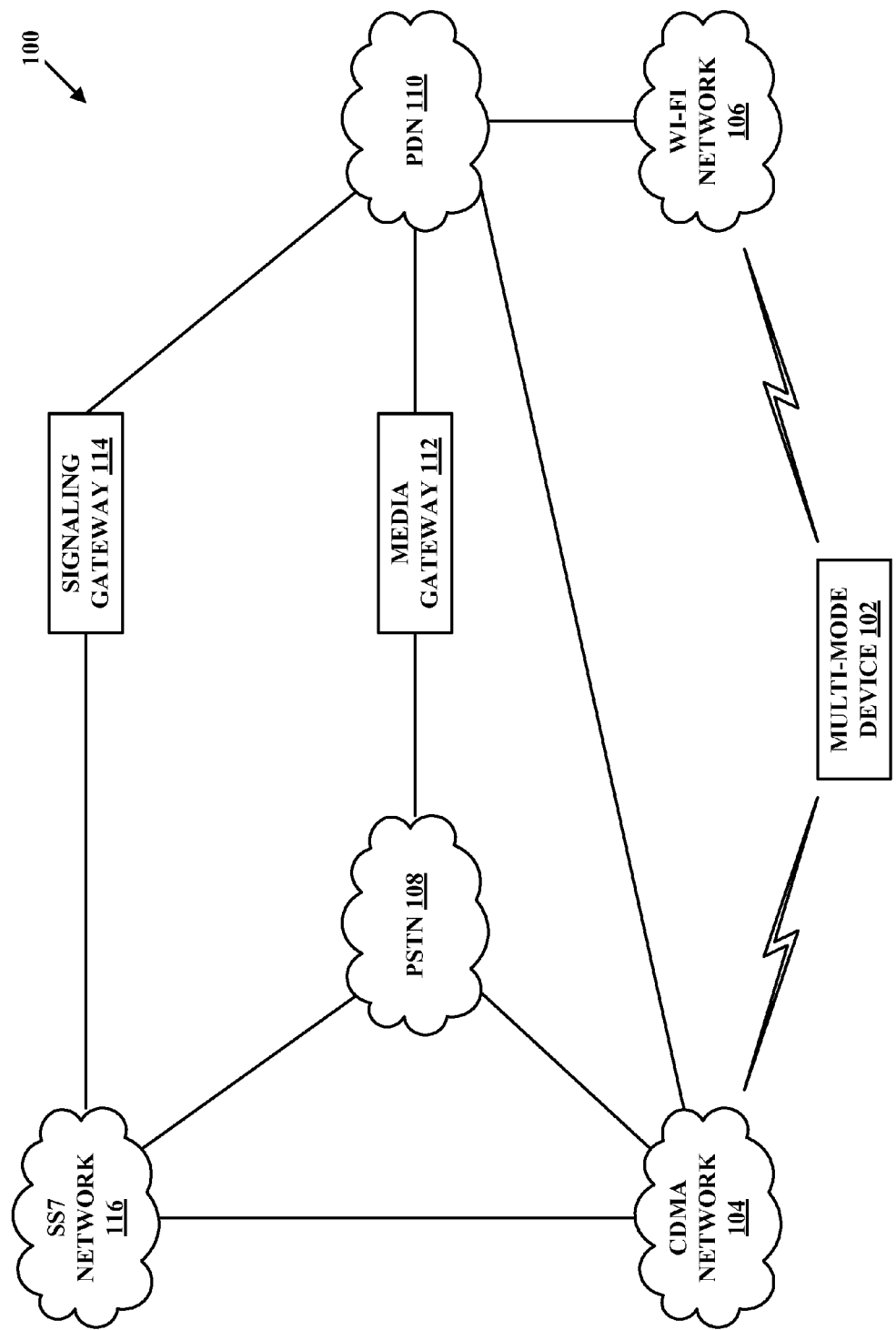
FIG. 1 is a simplified block diagram of a communication system, in accordance with exemplary embodiments.

Among other benefits and advantages, the present invention simplifies multi-mode devices by eliminating the robust SIP messaging module described above, such that the device will conduct all substantive signaling using a CDMA (e.g., IS-2000) messaging module. When in CDMA mode, the device will engage in normal CDMA signaling with a RAN, as described above. When in Wi-Fi mode, the device will not, however, engage in substantive SIP signaling as described above, but rather will encapsulate CDMA signaling messages in SIP (and/or another protocol), and transmit the encapsulated messages over a Wi-Fi network and a packet-switched network to a signaling gateway that will decapsulate the CDMA messages, translate them into SS7 messages, and transmit the SS7 messages over an SS7 network.

Furthermore, when the device is in Wi-Fi mode, that same signaling gateway, and/or another, will receive SS7 messages over an SS7 network, translate the SS7 messages into CDMA (e.g., IS-2000) messages, encapsulate the CDMA messages in, e.g., SIP, and transmit the encapsulated messages, again perhaps over a packet-switched network and a Wi-Fi network, to the device. The device will then decapsulate and process the CDMA messages. Note that other packet-switched protocols could be used instead of or in addition to SIP.

It should be noted as well that this encapsulation approach is preferably employed with respect to some but not all CDMA messages. Some examples of CDMA messages for which this approach would likely be employed include registration messages, call-setup messages, call-teardown messages, handoff-related messages (i.e., maintenance of the device's CDMA active set, candidate set, etc., perhaps for purposes of vertical handoffs from Wi-Fi to CDMA), and teleservice messages (e.g., Short Message Service (SMS) messages, Wireless Application Protocol (WAP) pushes, message-waiting indicators, etc.).

Some examples of CDMA messages for which this approach would preferably not be employed include CDMA power-control messages, messages related to Walsh-code and/or PN-offset encoding and decoding, and others that pertain not to call processing, but more to the air-interface relationship between the device and one or more CDMA base stations. This is not to say that the approach of the present invention could not be employed with respect to these CDMA messages: only that, at present, in preferred embodiments, the approach of the present invention is not used with respect to these messages.

Furthermore, the present invention does not contemplate using SIP to encapsulate CDMA messages in their entirety. In particular, CDMA messages, like IP messages, include multiple stacked layers according to different protocols, and the present invention contemplates using SIP to encapsulate some but not all of those layers. Specifically, the present invention contemplates not encapsulating information at the Media Access Control (MAC) and physical layers. These layers include large amounts of data that facilitate communication over CDMA air interfaces. This data—such as Walsh-code and PN-offset encoding—is not needed when exchanging SIP messages with a signaling gateway over Wi-Fi and a packet-switched network. Encapsulating these layers would be wasteful, resulting in much unnecessary processing.

According to the present invention, then, upper-layer portions of certain CDMA signaling messages would be encapsulated in SIP—and/or another packet-switched protocol—and exchanged over Wi-Fi and a packet-switched network between a multi-mode device and a signaling gateway. In one exemplary embodiment, the upper-layer portions would include the layers between and including the presentation and call-control layers. This is in contrast to the approach taken by Unlicensed Mobile Access (UMA), for example, according to which complete Global System for Mobile Communications (GSM) messages are encapsulated in IP for transport over Wi-Fi and a packet-switched network to a gateway. That is suited for GSM because GSM is a time-division-multiplexed protocol, and thus does not use the complex coding at the physical layer employed in CDMA. As stated above, encapsulation and decapsulation of complete (i.e., Walsh-code and PN-offset encoded) CDMA messages would be wasteful.

Because the IS-2000 signaling messages and the SIP signaling messages that are used in current multi-mode-device implementations communicate essentially the same parameters (e.g., calling party, called party, Mobile Identification Number (MIN), Mobile Station Identification (MSID), Electronic Serial Number (ESN), Network Access Identifier (NAI), etc.), it is not necessary to have—and inefficient to maintain—both messaging modules on the device. Furthermore, in current implementations, a signaling gateway is needed to translate between SIP and SS7. The present invention eliminates the need for having and maintaining that functionality on the network, as the network would always be translating between CDMA (e.g., IS-2000) and SS7, rather than doing that in addition to SIP/SS7 translations. And CDMA/SS7 (e.g., IS-2000/SS7) translations are well established.

Thus, the present invention eliminates the need to separately develop and maintain redundant functional modules, both on the multi-mode device and on the network. On the device, the robust SIP-messaging module is eliminated in favor of a simple SIP encapsulation engine (which would handle both encapsulation and decapsulation). On the network side, the need to translate between substantive SIP signaling messages and SS7 messages is eliminated in favor of a combination of a similar SIP encapsulation engine and the existing and well-developed CDMA/SS7 (e.g., IS-2000/SS7) translation functionality.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a multi-mode device 102, a CDMA network 104, a Wi-Fi network 106, a PSTN 108, a packet-data network (PDN) 110, a media gateway 112, a signaling gateway 114, and an SS7 network 116. And additional entities not depicted in FIG. 1 could be present as well. For example, there could be one or more additional multi-mode devices, other mobile stations, and/or other devices in communication with CDMA network 104, Wi-Fi network 106, PSTN 108, and/or PDN 110. Also, there could be one or more devices and/or networks making up at least part of one or more of the communication links. For example, there could be one or more routers, switches, or other devices or networks on the link between Wi-Fi network 106 and PDN 110.

Multi-mode device 102 may be any mobile device capable of communicating with one or more CDMA networks, such as CDMA network 104, and with one or more Wi-Fi networks, such as Wi-Fi network 106, and of carrying out the multi-mode-device functions described herein. As such, multi-mode device 102 may include a user interface, a wireless-communication interface, a processor, and data storage comprising instructions executable by the processor for carrying out the multi-mode-device functions described herein.

The user interface may include buttons, a touch-screen, a microphone, and/or any other elements for receiving inputs, as well as a speaker, one or more displays, and/or any other elements for communicating outputs.

Multi-mode device 102's wireless-communication interface may include one or more chipsets and antennas, as well as any other hardware and/or software, for enabling multi-mode device 102 to communicate with one or more CDMA networks, such as CDMA network 104, and with one or more Wi-Fi networks, such as Wi-Fi network 106. This may involve two distinct wireless-communication interfaces, a single integrated wireless-communication interface capable of communication with both types of networks, or perhaps some other arrangement.

Figure 2:
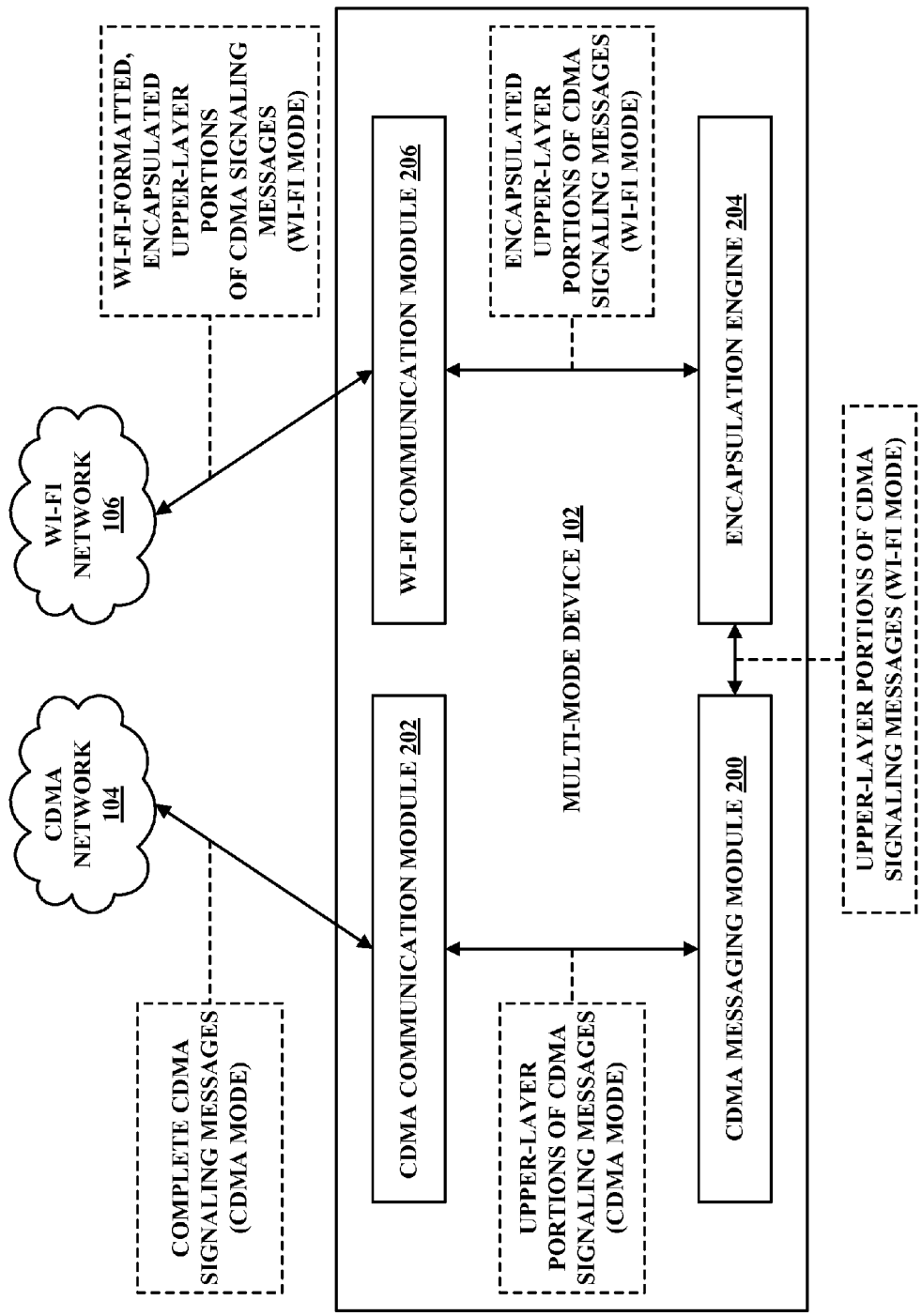
FIG. 2 is a simplified block diagram of a multi-mode device, in accordance with exemplary embodiments.

FIG. 2 provides a functional look at multi-mode device 102. As shown in FIG. 2, multi-mode device 102 may include a CDMA messaging module 200, a CDMA communication module 202, an encapsulation engine 204, and a Wi-Fi communication module 206. As stated herein, multi-mode device 102 may have a CDMA mode and a Wi-Fi mode. Furthermore, the functional entities 200-206 may each comprise any combination of hardware and/or software. For example, CDMA messaging module 200 could be implemented as software instructions and/or other data stored in memory and/or other data storage, while CDMA communication module 202 may be implemented as a combination of software and hardware, perhaps including some components of the above-described wireless-communication interface.

In operation, CDMA messaging module 200 generates upper-layer portions of CDMA signaling messages. For example, if the user initiates a call, CDMA messaging module 200 may responsively generate an upper-layer portion of an IS-2000 origination message. In general, the CDMA signaling messages could be registration messages, call-setup messages, call-teardown messages, handoff-related messages, and/or any other type of messages. And the upper-layer portions could include the layers between and including the presentation and call-control layers. As another example, the upper-layer portions could include the layers above and including the call-control layer. And other possibilities exist as well.

When device 102 is in CDMA mode—communicating over a CDMA air interface with a CDMA network such as CDMA network 104, CDMA messaging module 200 passes the upper-layer portions to CDMA communication module 202. When, however, device 102 is in Wi-Fi mode—communicating over a Wi-Fi air interface with a Wi-Fi network such as Wi-Fi network 106, device 102 instead passes those upper-layer portions to encapsulation engine 204.

And, when device 102 is in CDMA mode, CDMA messaging module 200 receives upper-layer portions of CDMA signaling messages from CDMA communication module 202. When device 102 is in Wi-Fi mode, however, CDMA messaging module 200 receives upper-layer portions of CDMA signaling messages instead from encapsulation engine 204. Either way, CDMA messaging module 200 processes the received upper-layer portions, which may involve examining the contents of the upper-layer portions, or perhaps passing those upper-layer portions to some other functional entity.

In a corresponding manner, when device 102 is in CDMA mode, CDMA communication module 202 receives upper-layer portions of CDMA signaling messages from CDMA messaging module 200. CDMA communication module 202 then adds lower-layer portions (such as MAC and physical-layer portions, including PN-offset and Walsh-code encoding) to the upper-layer portions to provide complete CDMA signaling messages, and transmits the complete CDMA signaling messages over an air interface to CDMA network 104. CDMA communication module 202 also receives complete CDMA signaling messages from CDMA network 104, removes lower-layer (e.g., MAC and physical) portions to provide upper-layer portions of CDMA signaling messages, and passes the upper-layer portions to CDMA messaging module 200.

When, however, device 102 is in Wi-Fi mode, encapsulation engine 204 receives upper-layer portions of CDMA signaling messages from CDMA messaging module 200, encapsulates the upper-layer portions in at least one packet-switched protocol (e.g., SIP and/or IP), and passes the encapsulated upper-layer portions to Wi-Fi communication module 206. Encapsulation engine 204 also receives encapsulated upper-layer portions of CDMA signaling messages from Wi-Fi communication module 206, decapsulates them, and passes them to CDMA messaging module 200.

Also when device 102 is in Wi-Fi mode, Wi-Fi communication module 206 receives encapsulated upper-layer portions of CDMA signaling messages from encapsulation engine 204, and transmits them over a Wi-Fi air interface to Wi-Fi network 106 for delivery to signaling gateway 114. In so doing, Wi-Fi communication module 206 may format the encapsulated upper-layer portions for transmission over Wi-Fi. Wi-Fi communication module 206 also receives encapsulated upper-layer portions of CDMA signaling messages over a Wi-Fi air interface from Wi-Fi network 106, and passes them to encapsulation engine 204.

With respect to voice traffic, both modes of multi-mode device 102 may involve using a codec known as the Enhanced Variable Rate Codec (EVRC) for encoding audible voice input in a digitized format for transmission, and for decoding voice data received in that digitized format to produce audible voice output. In CDMA mode, the EVRC traffic could be exchanged over the CDMA air interface with the RAN using Walsh-code and PN-offset encoding. In Wi-Fi mode, the EVRC traffic could be exchanged using RTP/IP, in part over Wi-Fi and in part over other elements and networks making up a packet-switched communication path with a gateway or other endpoint. It should be understood, however, that codecs other than EVRC and transport protocols other than RTP could be used.

Returning the reader's attention to FIG. 1, CDMA network 104 may include a number of devices that cooperate to communicate with multi-mode device 102 over an air interface according to a CDMA standard such as IS-95 or IS-2000, and to thereby provide multi-mode device 102 with the ability to communicate over PSTN 108 and PDN 110. As such, CDMA network 104 may be communicatively connected to at least PSTN 108, PDN 110, and SS7 network 116 (for setting up calls over PSTN 108). CDMA network 104 may include one or more base stations with which device 102 communicates over the air interface. These base stations may be connected to and controlled by one or more base station controllers (BSCs). The BSCs, in turn, may be connected to one or more mobile station controllers (MSCs), which are switching elements that may communicate over SS7 network 116 and provide access to PSTN 108. The BSCs may also be connected to one or more packet data serving nodes (PDSNs), which provide packet-data connectivity to PDN 110.

Wi-Fi network 106 may include a number of devices that cooperate to communicate with multi-mode device 102 over an air interface according to a Wi-Fi standard such as IEEE 802.11, and to thereby provide multi-mode device 102 with the ability to communicate over PDN 110. Wi-Fi network 106 may include at least one access point with which multi-mode device 102 communicates over the Wi-Fi air interface. The access point may in turn be connected with a network access device such as a cable modem, DSL modem, network access server, or other data communication device, which in turn provides connectivity with PDN 110.

PSTN 108 may be the well-known telephony network known as the public switched telephone network, and may be communicatively coupled with at least CDMA network 104, media gateway 112, and SS7 network 116. PDN 110 may be communicatively coupled with at least CDMA network 104, Wi-Fi network 106, media gateway 112, and signaling gateway 114, and may include one or more wide area networks, one or more local area networks, one or more public networks such as the Internet, one or more private networks, one or more wired networks, one or more wireless networks, and/or one or more networks of any other variety. Devices in communication with PDN 110 may exchange data using a packet-switched protocol such as IP, and may be identified by an address such as an IP address.

Media gateway 112 may be any networking device arranged to provide a link between PSTN 108 and PDN 110, and to carry out the media-gateway functions described herein. As such, media gateway 112 may include a processor and data storage comprising instructions executable by the processor to carry out the media-gateway functions described herein. Media gateway 112 may also include an interface with PSTN 108, and an interface with PDN 110, and may (i) receive circuit-switched communications from PSTN 108, convert those communications to a packet-switched format, and transmit the converted communications over PDN 110 and (ii) receive packet-switched communications from PDN 110, convert those communications to a circuit-switched format, and transmit the converted communications over PSTN 108.

Signaling gateway 114 may be any networking device arranged to provide a link between PDN 110 and SS7 network 116, and generally to carry out the signaling-gateway functions described herein. As such, signaling gateway 114 may include a processor and data storage comprising instructions executable by the processor to carry out the signaling-gateway functions described herein. Signaling gateway 114 may also include an interface for communicating over PDN 110, and an interface for communicating over SS7 network 116.

Signaling gateway 114 may receive, from multi-mode device 102 over Wi-Fi network 106 and PDN 110, upper-layer portions of CDMA signaling messages encapsulated in at least one packet-switched protocol. Signaling gateway 114 then decapsulates the upper-layer portions, translates them into SS7 messages, and transmits the SS7 messages over SS7 network 116. Signaling gateway 114 may also function to receive SS7 messages over SS7 network 116, translate them into upper-layer portions of CDMA signaling messages, encapsulate the upper-layer portions in at least one packet-switched protocol, and transmit the encapsulated upper-layer portions to device 102 over PDN 110 and Wi-Fi network 106. Note that signaling gateway 114 may translate between SS7 messages and upper-layer portions of CDMA signaling messages with reference to a conversion table, other conversion logic, and/or in any other manner.

Note that the CDMA signaling messages could be IS-2000 messages, and could include registration, call-setup, call-teardown, handoff, and/or any other types of messages. And the upper-layer portions of these messages could consist of the layers between and including the presentation and call-control layers, the layers above and including the call-control layer, and/or any otherwise-defined upper-layer portions.

Furthermore, as examples, the packet-switched protocol could be SIP and/or IP, and the SS7 messages could be ISUP messages.

SS7 network 116 may be the well-known SS7 network commonly used to perform call-processing functions on behalf of telephony endpoints. As such, SS7 network 116 may include signal transfer points (STPs), signal control points (SCPs), and/or any other elements now known or later developed for use in signaling networks. SS7 network may be communicatively connected to at least CDMA network 104, PSTN 108, and signaling gateway 114.

3. Exemplary Operation

Figure 3:
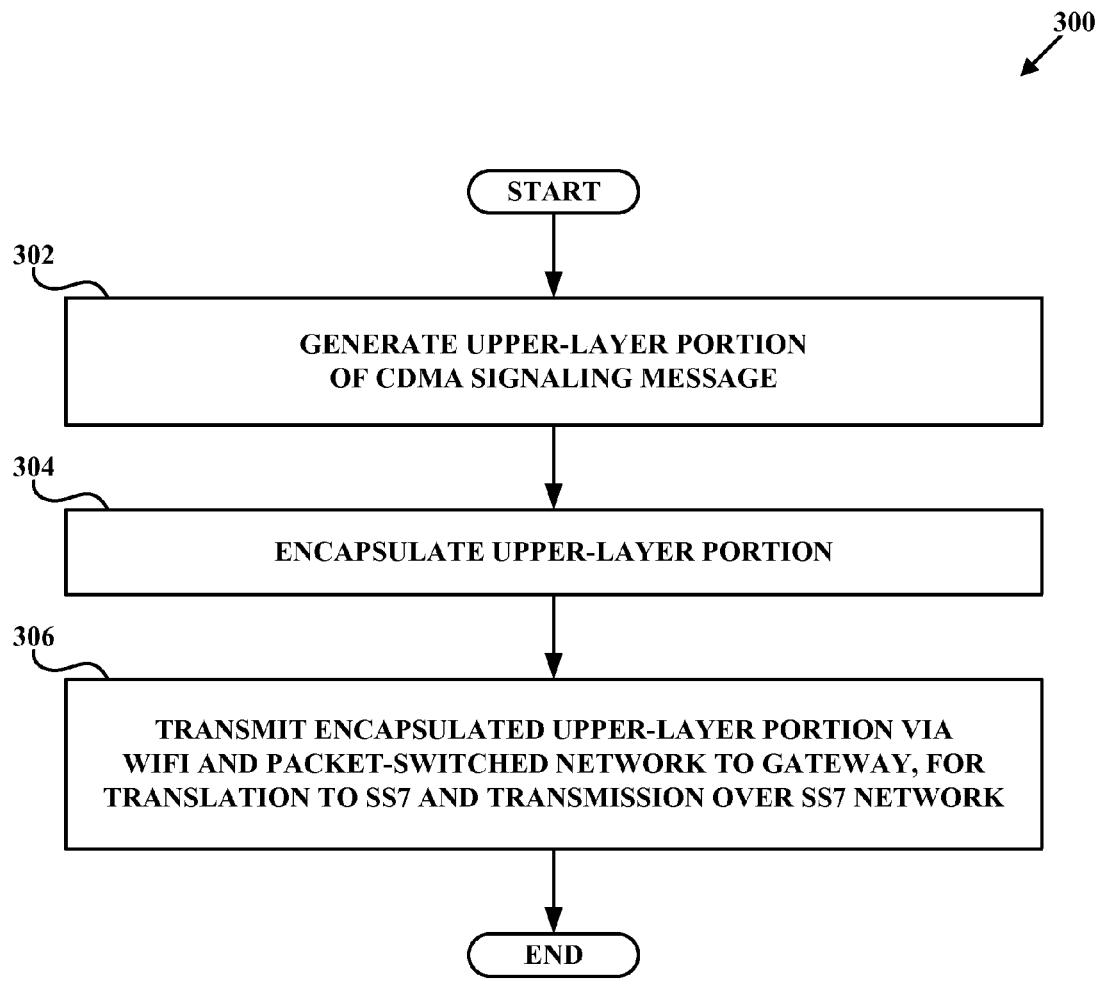
FIG. 3 is a flowchart of a method, in accordance with exemplary embodiments.

FIG. 3 depicts a flowchart of an exemplary method, in accordance with an exemplary embodiment. As shown in FIG. 3, a method 300 begins at step 302, when multi-mode device 102 generates an upper-layer portion of a CDMA signaling message, perhaps by making use of CDMA messaging module 200. As stated herein, the CDMA signaling message could be an IS-2000 message, such as a registration message, a call-setup message, a call-teardown message, and/or a handoff message. Furthermore, also as stated herein, the upper-layer portion could consist of the layers between and including the presentation and call-control layers, or perhaps the layers above and including the call-control layer.

At step 304, multi-mode device 102 encapsulates the upper-layer portion generated in step 302 in at least one packet-switched-protocol. Thus, CDMA messaging module 200 could—since, in this example, device 102 is operating in Wi-Fi mode—pass the generated upper-layer portion to encapsulation engine 204, which could then encapsulate the upper-layer portion in SIP, IP, and/or any other packet-switched protocol. As one example, step 304 could involve generating a SIP MESSAGE (or another SIP method) for transmission to signaling gateway 114.

At step 306, multi-mode device 102 transmits the encapsulated upper-layer portion via Wi-Fi network 106 and PDN 110 to signaling gateway 114, which then translates the upper-layer portion into an SS7 message, and transmits that SS7 message over SS7 network 116. As such, whatever call-processing function device 102 intended can be carried out over SS7 network 116.

Note that multi-mode device 102 may also receive encapsulated upper-layer portions of CDMA signaling messages from signaling gateway 114, via PDN 110 and Wi-Fi network 106. This may occur as a result of signaling gateway 114 receiving SS7 messages over SS7 network 116, converting them into the upper-layer portions of CDMA signaling messages, encapsulating the upper-layer portions, and then sending the encapsulated upper-layer portions over PDN 110 and Wi-Fi network 106 to device 102. Multi-mode device 102 may then decapsulate the received encapsulated upper-layer portions, perhaps by making use of encapsulation engine 204, and then process the received upper-layer portions, perhaps by making use of CDMA messaging module 200, and/or one or more other functional modules.

4. Conclusion

Various exemplary embodiments have been described above. Those skilled in the art will understand, however, that changes and modifications may be made to those examples without departing from the scope of the claims.

What is claimed is:

1. A method carried out by a multi-mode device having a Code Division Multiple Access (CDMA) mode and a Wi-Fi mode, and comprising a CDMA messaging module, a CDMA communication module, an encapsulation engine, and a Wi-Fi communication module, the method comprising:

the CDMA messaging module (i)(a) generating upper-layer portions of CDMA signaling messages and (b) passing the upper-layer portions to the CDMA communication module when the device is in CDMA mode and instead to the encapsulation engine when the device is in Wi-Fi mode, and (ii)(a) receiving upper-layer portions of CDMA signaling messages from the CDMA communication module when the device is in CDMA mode and instead from the encapsulation engine when the device is in Wi-Fi mode and (b) processing the upper-layer portions;

when the device is in CDMA mode, the CDMA communication module (i)(a) receiving upper-layer portions of CDMA signaling messages from the CDMA messaging module, (b) adding lower-layer portions to the upper-layer portions to provide complete CDMA signaling messages, and (c) transmitting the complete CDMA signaling messages over a CDMA air interface to a CDMA network and (ii)(a) receiving complete CDMA signaling messages over a CDMA air interface from a CDMA network, (b) removing lower-layer portions from the complete CDMA signaling messages to provide upper-layer portions of CDMA signaling messages, and (c) passing the upper-layer portions to the CDMA messaging module;

when the device is in the Wi-Fi mode, the encapsulation engine (i)(a) receiving upper-layer portions of CDMA signaling messages from the CDMA messaging module, (b) encapsulating the upper-layer portions in at least one packet-switched protocol, and (c) passing the encapsulated upper-layer portions to the Wi-Fi communication module and (ii)(a) receiving encapsulated upper-layer portions of CDMA signaling messages from the Wi-Fi communication module, (b) decapsulating the upper-layer portions, and (c) passing the upper-layer portions to the CDMA messaging module; and when the device is in Wi-Fi mode, the Wi-Fi communication module (i)(a) receiving encapsulated upper-layer portions of CDMA signaling messages from the encapsulation engine and (b) transmitting the encapsulated upper-layer portions over a Wi-Fi air interface to a Wi-Fi network for delivery to a signaling gateway and (ii)(a) receiving encapsulated upper-layer portions of CDMA signaling messages over a Wi-Fi air interface from a Wi-Fi network and (b) passing the encapsulated upper-layer portions to the encapsulation engine.

2. The method of claim 1, wherein the CDMA mode is an IS-2000 mode, the CDMA messaging module is an IS-2000 messaging module, the CDMA communication module is an IS-2000 communication module, the CDMA signaling messages are IS-2000 signaling messages, the CDMA air interface is an IS-2000 air interface, and the CDMA network is an IS-2000 network.

3. The method of claim 1, wherein the Wi-Fi mode is an Institute of Electronics and Electrical Engineers (IEEE) 802.11 mode, the Wi-Fi communication module is an IEEE 802.11 communication module, the Wi-Fi air interface is an IEEE 802.11 air interface, and the Wi-Fi network is an IEEE 802.11 network.

4. The method of claim 1, wherein the at least one packet-switched-protocol comprises at least one of the Session Initiation Protocol (SIP) and the Internet Protocol (IP).

5. The method of claim 1, wherein the upper-layer portions of CDMA signaling messages consist of (i) a plurality of layers between and including a presentation layer and a call-control layer or (ii) a plurality of layers above and including a call-control layer.

6. The method of claim 1, wherein the CDMA signaling messages comprise at least one of a registration message, a call-setup message, a call-teardown message, a handoff message, and a teleservice message.

* * * * *